May 5, 1959   B. M. MOORE ET AL   2,884,742
SOIL RECLAMATION MACHINE AND METHOD INCLUDING WASHING
Filed Nov. 23, 1954
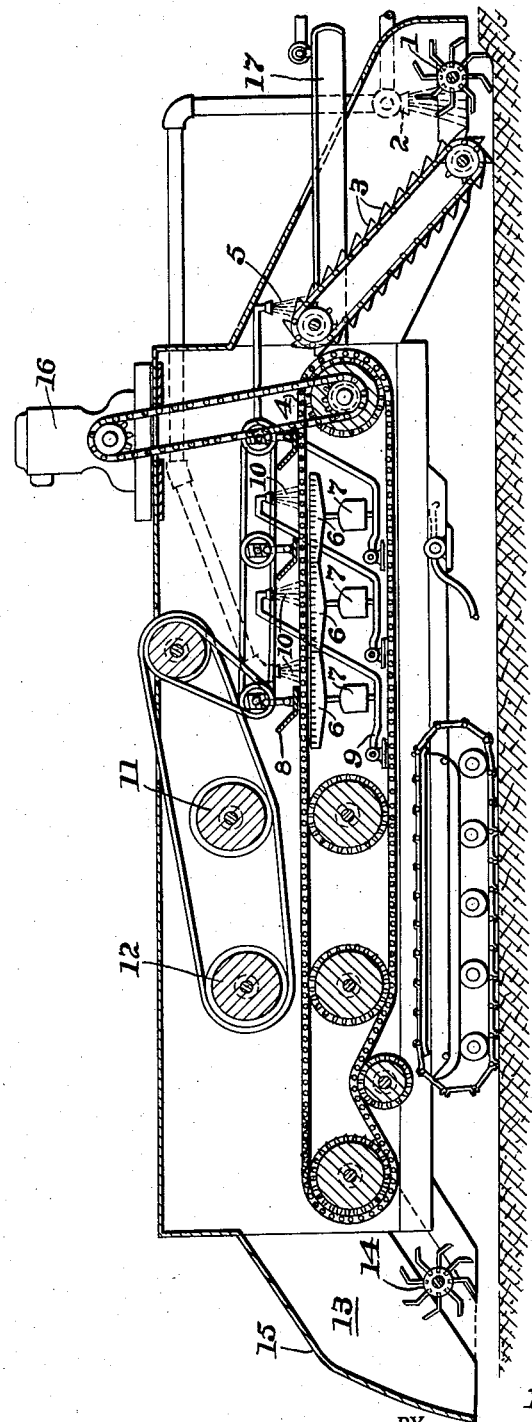
INVENTORS:
Ben M. Moore,
Edward E. Litkenhous,
BY Cushman, Darby & Cushman
ATTORNEYS.

United States Patent Office 2,884,742
Patented May 5, 1959

2,884,742

SOIL RECLAMATION MACHINE AND METHOD INCLUDING WASHING

Ben M. Moore and Edward E. Litkenhous, Nashville, Tenn.

Application November 23, 1954, Serial No. 470,747

6 Claims. (Cl. 47—58)

The invention relates to method and apparatus for treating and reclaiming soils or pulverized ores and rocks.

The present invention involves certain improvements over the disclosure of applicants' copending application Serial Number 370,402 filed July 27, 1953 and entitled, "Method and Apparatus for Reclaiming Soil," which is now abandoned. Both disclosures have the following elements in common:

A method of lifting a layer of topsoil of any disclosed thickness, comminuting the said topsoil, adding water (if needed and available), mechanically extracting therefrom a major portion of the chemical bearing water, and conducing or forcing said extracted chemical-bearing water where wanted, and reconditioning soil prior to returning it to the ground.

It is the object of this invention to improve the condition of land (whether in situ or hauled) by removing or separating undesirable soluble materials.

It is another object to concentrate the solubles to an optimum concentration so that both a minimum of solvent may be used and a recovery of solute made if the solubles obtained possess recovery value.

These and other objects and advantages of the invention will become apparent as the following detailed specification is read:

(In the drawing like reference characters refer to the same parts.)

The single figure is an elevation view of the improvements shown in the invention.

In the drawing, the rotary chopper and disintegrator 1 pulverizes the earth layer and at the same time mixes (if necessary) a solvent with or without a wetting agent. The water 2 is proportioned and blended prior to being physically thrown onto a moving belt, slat or bucket conveyor 3 which elevates the wet soil onto a moving filtration belt or screen 4. Additional water may be sprayed 5 or proportioned into the earth as the soil or pulverized ore and rock is moved up the moving screen. This solvent may be fresh or somewhat concentrated by counter current movement through the last vacuum box 6 and receiver 7 under the belt 4. The solvent is thoroughly mixed by the oscillating eccentrics 8. These move and vibrate the wet soil both across the machine as well as up-and-down. Each box and receiver is equipped with a pump 9 for water recirculation or removal. Additional solvent 10 or less concentrated solvent (in counter current washing) may be added all along the belt or screen.

A stabilizer roll or belt 11 controlled either manually or by instrumentation puts a stabilizing pressure on the moving soil prior to final pressure of roll 12 which compresses soil to desired final moisture content.

The earth then moves to the rear pulverizer unit 13 which is composed of a set of high speed tines 14 for restoring, returning and/or spreading the soil. A hood 15 keeps the pulverized soil from blowing.

A conventional power unit 16 is used for operating the machine. A tow bar 17 enables the machine to be towed by existing prime movers.

Having thus described our invention, we claim:

1. In a machine for treating and reclaiming soil and the like by washing chemicals therefrom, having in combination an endless screen conveyor connected to the machine, means for moving the conveyor longitudinally for conducting the material thereon from the front to the rear of the machine, rotary means for lifting a strip of soil and pulverizing the same, means between said rotary means and said conveyor for washing the soil with water, suction means below the conveyor for withdrawing the chemically-bearing water from the soil on the conveyor, oscillating means above the conveyor and engaging the soil thereon for accelerating the separation of the liquid from the soil, and means for imparting stabilizing pressure to the soil on the conveyor.

2. In a machine for treating and reclaiming soil, as called for in claim 1, means adjacent the rotary means for mixing a solvent with the pulverized soil for increasing the moisture content thereof as the soil is fed to said conveyor, means as the pulverized soil is fed through the machine by the conveyor for spraying the same with a solvent.

3. A machine, as called for in claim 1, in which the stabilizing means includes a stabilizing roller, means for imparting a substantially wedge shape to the pulverized soil as it is advancing toward said stabilizing means.

4. A machine, as called for in claim 1, in which the suction means includes at least one vacuum box, a receptacle communicating with said box, and a pump communicating with said receptacle for withdrawing the liquid extracted from the soil on the conveyor.

5. A machine for treating and reclaiming soil, as called for in claim 3, in which a pulverizing unit is positioned at the rear of the machine for receiving the soil from the conveyor.

6. An improved method for lowering the soluble chemical content of soil which includes lifting a layer of top soil from the ground, pulverizing the layer of soil, feeding the pulverized soil to an endless screen conveyor, adding a solvent to the soil as it is fed to the conveyor to increase the moisture content thereof, extracting the chemical-bearing water from the soil, and reconditioning the soil prior to returning it to the ground.

References Cited in the file of this patent

UNITED STATES PATENTS

| | | |
|---|---|---|
| 1,018,513 | Meyer | Feb. 27, 1912 |
| 1,621,694 | Tracy | Mar. 22, 1927 |
| 1,802,211 | Lively | Apr. 21, 1931 |
| 1,906,127 | Reishus | Apr. 25, 1933 |
| 1,930,015 | Meyer | Oct. 10, 1933 |
| 1,996,771 | Macready | Apr. 9, 1935 |
| 2,775,174 | Petrick | Dec. 25, 1956 |

FOREIGN PATENTS

| | | |
|---|---|---|
| 209,362 | Great Britain | Jan. 10, 1924 |

OTHER REFERENCES

Chemical Abstracts, vol. 1, page 2396, published 1907, article, "Reclamation of White-Ash Lands."